Oct. 5, 1937.   L. J. PFISTER   2,095,007
AGRICULTURAL MACHINE
Filed Aug. 8, 1936   5 Sheets-Sheet 1
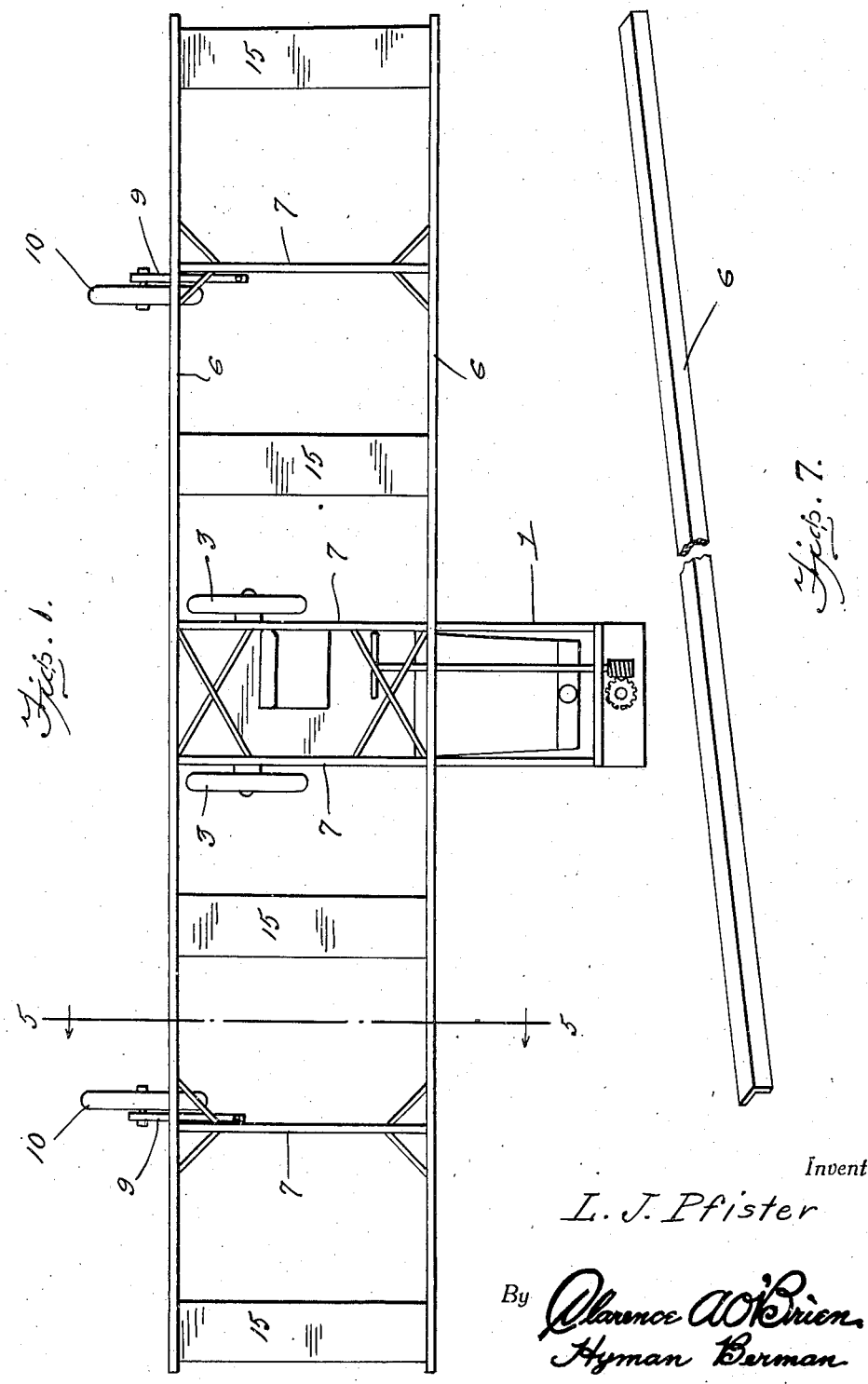
Inventor
*L. J. Pfister*
By *Clarence A. O'Brien*
*Hyman Berman*
Attorneys

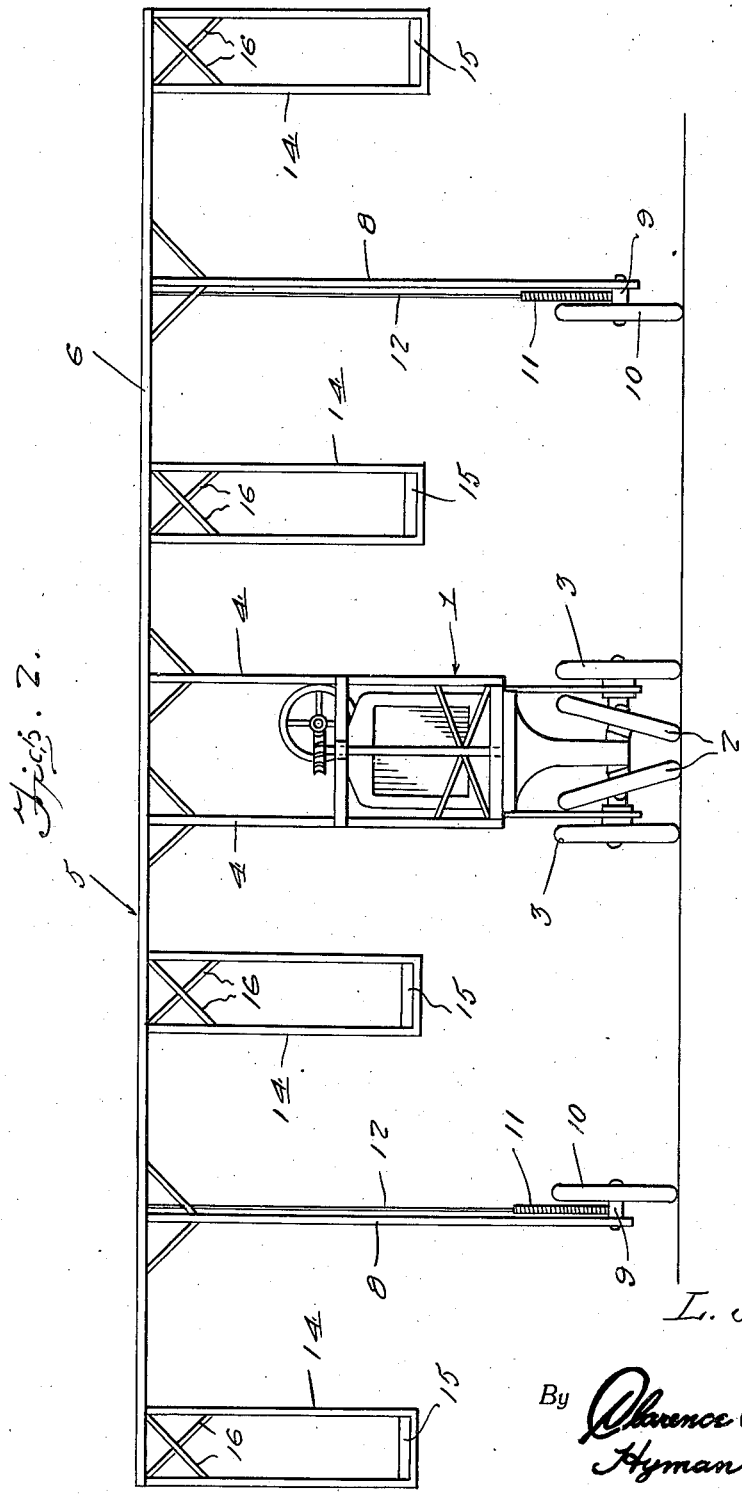

Oct. 5, 1937.     L. J. PFISTER     2,095,007
AGRICULTURAL MACHINE
Filed Aug. 8, 1936     5 Sheets-Sheet 3
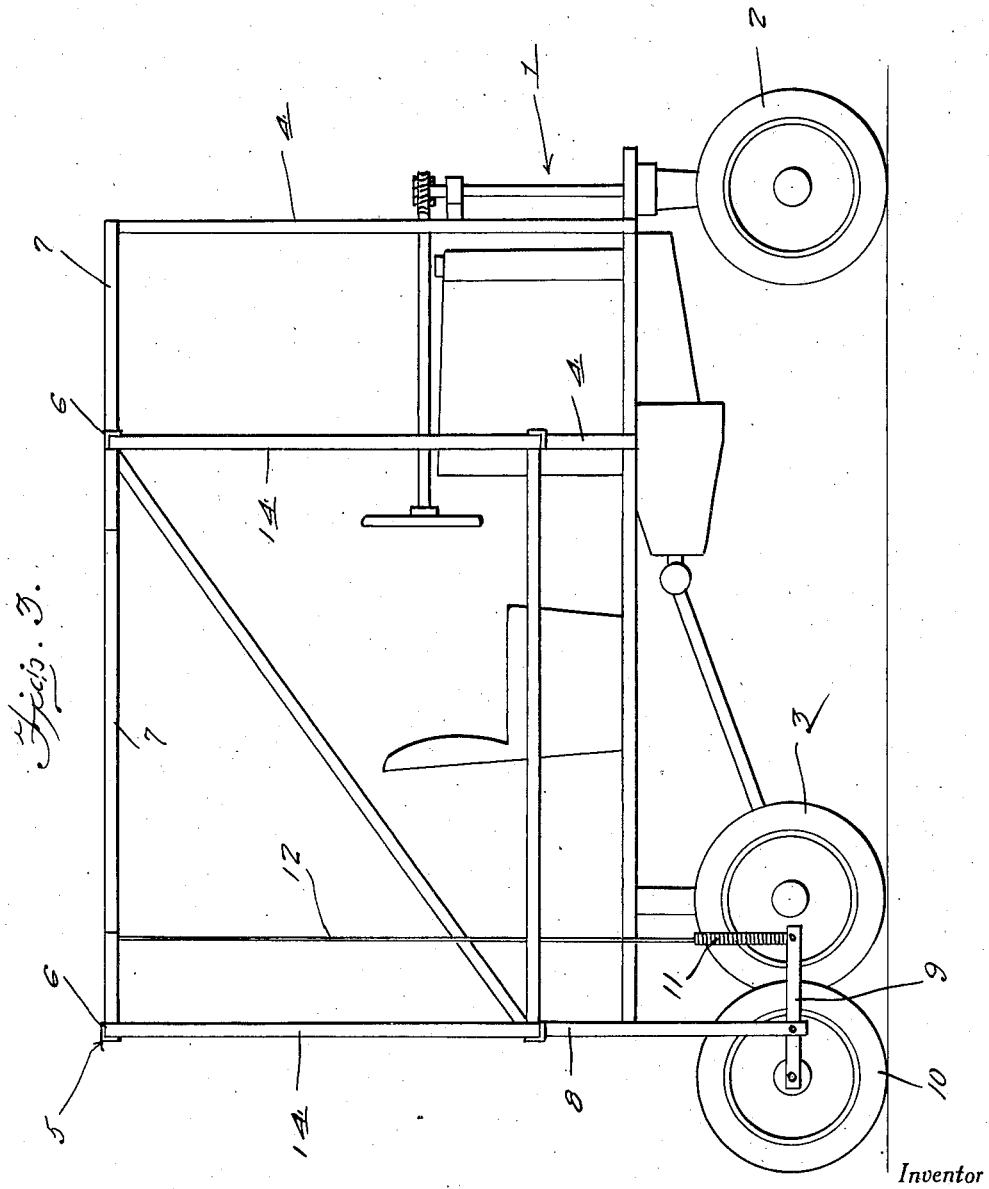
Inventor
L. J. Pfister
By Clarence A. O'Brien
Hyman Berman
Attorneys

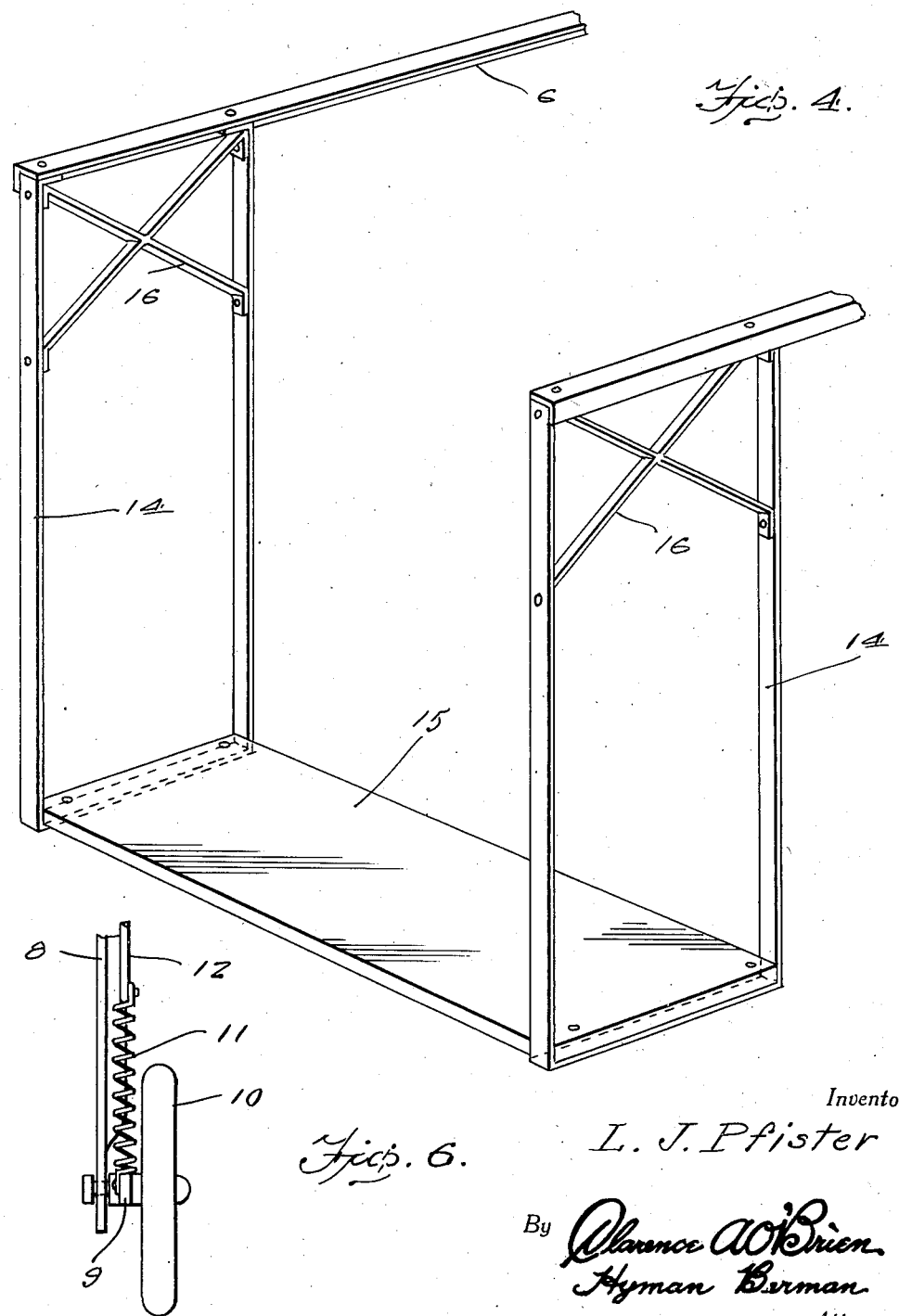

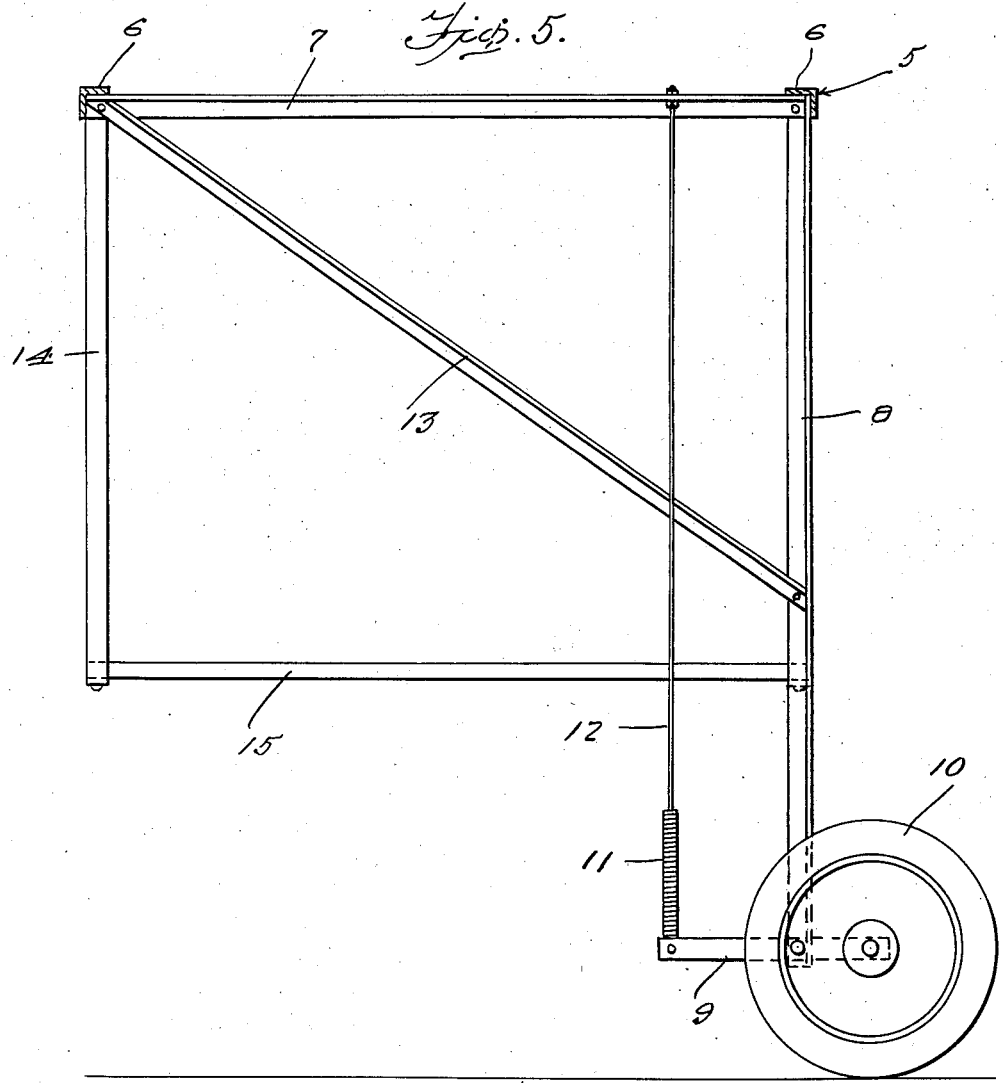
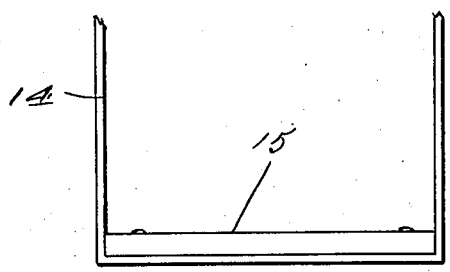

Patented Oct. 5, 1937

2,095,007

UNITED STATES PATENT OFFICE

2,095,007

AGRICULTURAL MACHINE

Lester John Pfister, El Paso, Ill.

Application August 8, 1936, Serial No. 95,029

3 Claims. (Cl. 280—29)

The present invention relates to new and useful improvements in agricultural machines, and has for its primary object to provide, in a manner as hereinafter set forth, an apparatus of this character which is adapted to move under its own power through a field of corn and which embodies a novel construction and arrangement for supporting a number of workers in a manner to permit the tassels of a plurality of rows of corn to be removed simultaneously.

Other objects of the invention are to provide an agricultural machine of the aforementioned character which will be comparatively simple in construction, strong, durable, highly efficient and reliable in use, and which may be manufactured at low cost.

All of the foregoing and still further objects and advantages of the invention will become apparent from a study of the following specification, taken in connection with the accompanying drawings, wherein like numerals of reference designate corresponding parts throughout the several views, and wherein:

Figure 1 is a top plan view of an agricultural machine constructed in accordance with the present invention.

Figure 2 is a view in front elevation thereof.

Figure 3 is a side elevational view.

Figure 4 is a perspective view of one of the suspended platforms.

Figure 5 is a vertical sectional view, taken substantially on the line 5—5 of Figure 1.

Figure 6 is a detail view in front elevation of one of the resiliently mounted frame supporting wheels.

Figure 7 is a detail view in perspective of one of the cross beams.

Figure 8 is a view in front elevation of one of the platforms.

Referring now to the drawings in detail, it will be seen that the embodiment of the invention which has been illustrated, comprises a motor driven carrier which is designated generally by the reference numeral 1, said carrier being of narrow gauge and having rubber tire equipped front and rear wheels 2 and 3 respectively, which are preferably arranged substantially as shown to advantage in Figures 2 and 3 of the drawings.

Rising from the carrier 1 are uprights 4 on which a transversely elongated horizontal frame is mounted, said frame being designated generally by the reference numeral 5. The frame 5 comprises cross beams 6 of suitable length between which longitudinal braces 7 extend.

Depending from the rear beam 6 on opposite sides of the carrier 1 are bars 8 on the lower end portions of which levers 9 are pivotally mounted at intermediate points. Rubber tire equipped wheels 10 are journalled on one end portion of the levers 9. The other end portions of the levers 9 are yieldingly connected to the longitudinal braces 7 of the frame 5 by coil springs 11 and rods 12. This is shown to advantage in Figure 5 of the drawings. Inclined braces 13 are provided for the vertical wheel supporting bars 8.

Depending from the front and rear beams 6 of the supporting frame 5 at spaced points are pairs of substantially U-shaped hangers 14. Mounted in the pairs of hangers 14 are platforms 15. Substantially X-shaped braces 16 are provided in the upper portions of the hangers 14.

It is thought that the operation of the machine will be readily apparent from a consideration of the foregoing. The apparatus is adapted to travel through a field of growing corn, the carrier 1 passing between two rows with the platforms 15 and the wheels 10 passing between other rows. It will thus be seen that the tassels may be rapidly removed from a plurality of rows of corn simultaneously by workmen mounted on the platforms 15. Of course, the motor driven carrier 1 must have an operator. Also, if desired, the tassels may be removed from the innermost rows of corn by workmen standing on the carrier 1, which, as previously stated, passes between two of the rows. The wheels 10 materially assist in supporting the outer end portions of the frame structure 5. Further, the resilient mountings of the wheels 10 permit same to pass readily over any irregularities or obstructions that are encountered.

It is believed that the many advantages of an agricultural machine constructed in accordance with the present invention will be readily understood, and although a preferred embodiment of the apparatus is as illustrated and described, it is to be understood that changes in the details of construction and in the combination and arrangement of parts may be resorted to which will fall within the scope of the invention as claimed.

What is claimed is:

1. A machine of the class described comprising a carrier, a transverse supporting frame mounted in elevated position on said carrier, and a plurality of workmen supporting platforms suspended from said supporting frame at spaced points and ground wheels supporting said frame and positioned inwardly of the ends of the frame between each pair of said platforms.

2. An agricultural machine of the class described comprising a carrier, a transverse supporting frame mounted in elevated position on said carrier, ground wheels yieldingly mounted beneath said supporting frame on opposite sides of the carrier, and a plurality of platforms suspended from said supporting frame at spaced points and positioned at opposite sides of said wheels.

3. A machine of the class described comprising a carrier, a transverse supporting frame mounted in elevated position on said carrier and extending laterally at opposite sides of the vertical plane of the carrier, workmen-supporting platforms suspended from the laterally extended portions of said supporting frame and spaced from the carrier, and ground wheels for supporting the laterally extended portions of the supporting frame and connected with said portions.

LESTER JOHN PFISTER.